Sept. 20, 1971  E. K. SEDGWICK  3,606,450
WHEELCHAIR TABLE-DESK
Filed July 7, 1969  5 Sheets-Sheet 1

INVENTOR
EARL K. SEDGWICK
BY
ATTORNEY

Sept. 20, 1971   E. K. SEDGWICK   3,606,450
WHEELCHAIR TABLE-DESK
Filed July 7, 1969   5 Sheets-Sheet 2
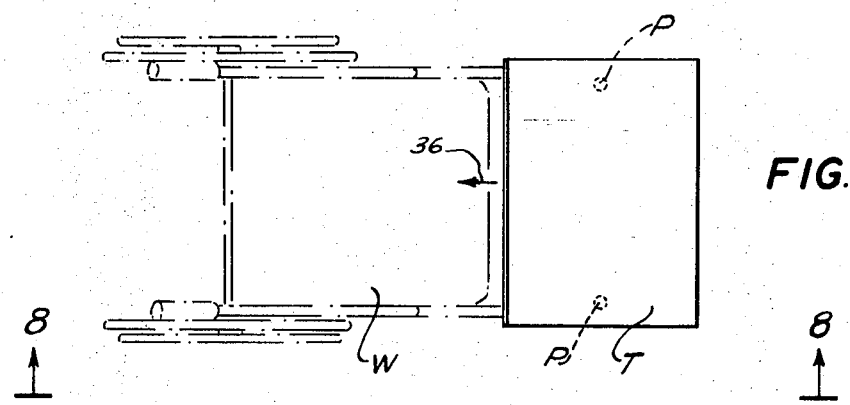
FIG. 5
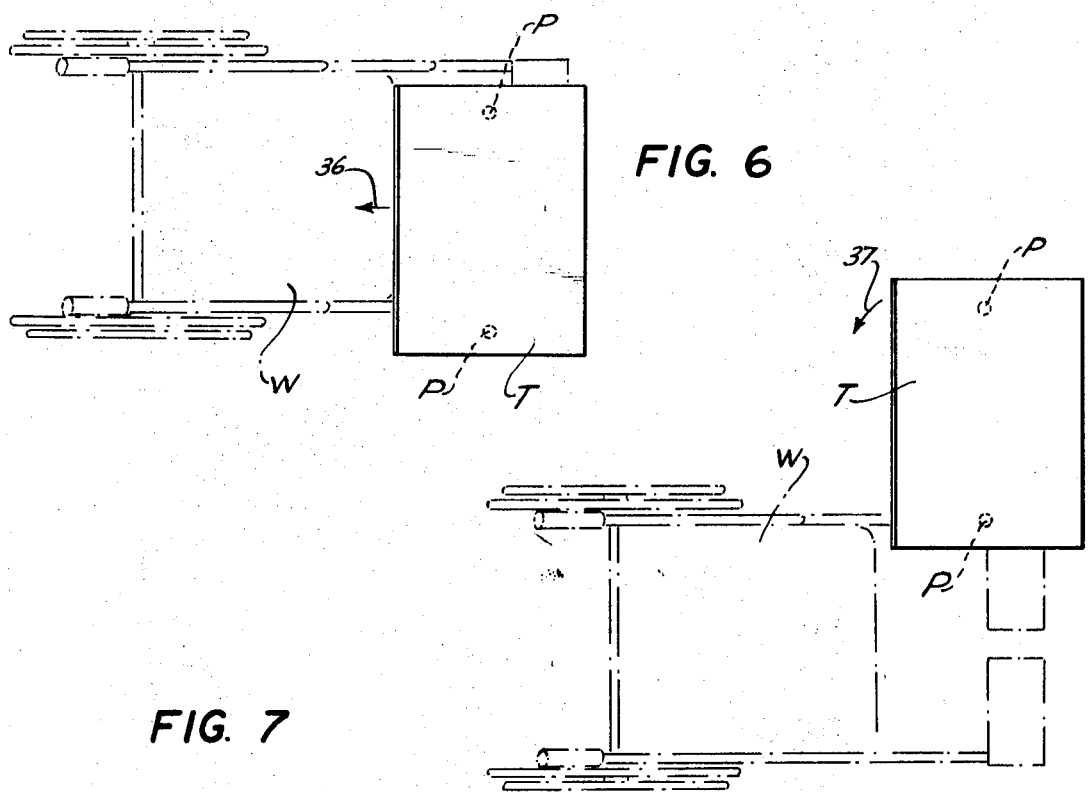
FIG. 6
FIG. 7
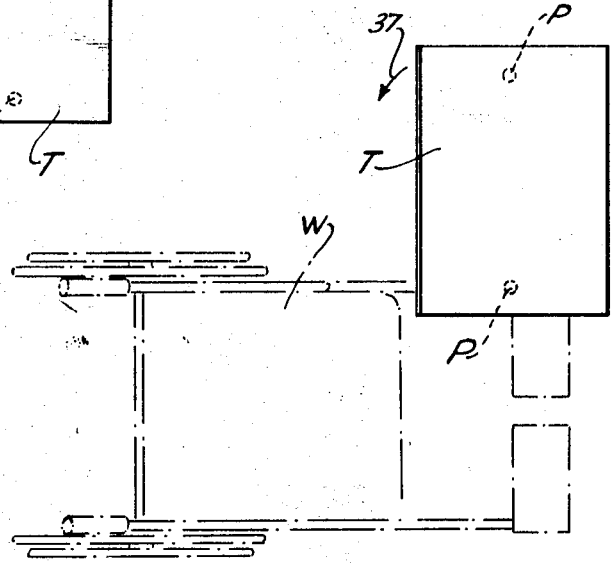
FIG. 8
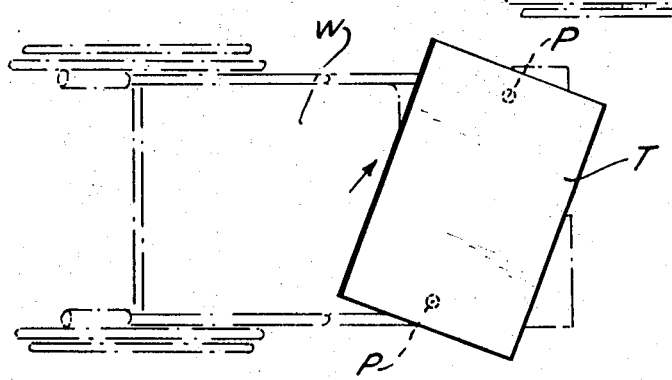
INVENTOR
EARL K. SEDGWICK
BY
ATTORNEY

INVENTOR
EARL K. SEDGWICK
BY
ATTORNEY

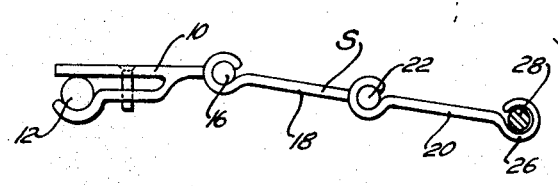
FIG. 12
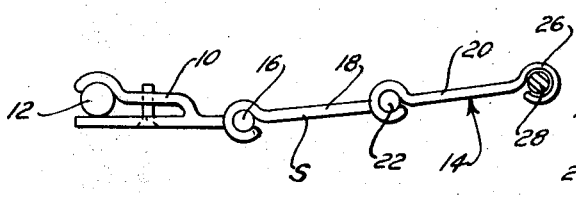
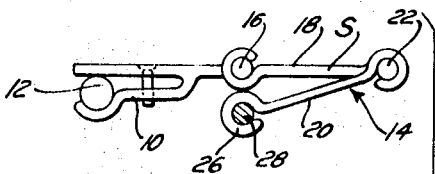
FIG. 16
FIG. 13
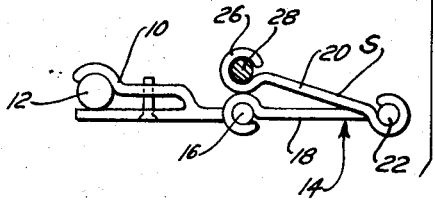
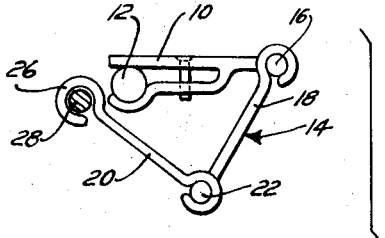
FIG. 15
FIG. 14
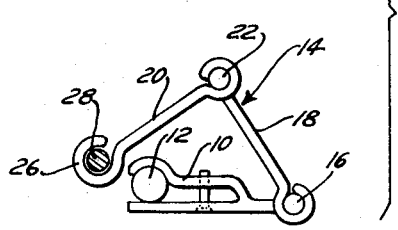
INVENTOR
EARL K. SEDGWICK
BY
ATTORNEY Sept. 20, 1971  E. K. SEDGWICK  3,606,450
WHEELCHAIR TABLE-DESK
Filed July 7, 1969  5 Sheets-Sheet 5

INVENTOR
EARL K. SEDGWICK
BY
ATTORNEY

United States Patent Office 3,606,450
Patented Sept. 20, 1971

3,606,450
WHEELCHAIR TABLE-DESK
Earl K. Sedgwick, 42 Carlton Place,
Rutherford, N.J. 07073
Filed July 7, 1969, Ser. No. 839,224
Int. Cl. A47b 37/02
U.S. Cl. 297—149                              10 Claims

ABSTRACT OF THE DISCLOSURE

A wheelchair table-desk comprising a table-desk top, spaced posts mounting said top and a support for the same, the support and mounting posts being constructed and designed to enable a handicapped person to (a) adjustably move the table top horizontally to a substantial variety of positions, (b) to move the table top to vertically adjusted positions within a wide latitude, (c) to adjustably move the same to a number of inclined positions, and (d) to permit ready detachable attachment of the table top to and from a wheelchair, all adjustments and operations being capable of being accomplished by hand manipulation of the parts of the table-desk by the patient rapidly and without resort to any tools or aids.

---

This invention relates to a wheelchair table-desk for wheelchair patients, and particularly paraplegics and quadraplegics, especially designed to allow them the widely diversified use so important for such confined and handicapped patients.

The prime object of my invention centers about the provision of a wheelchair table-desk adapted for attachment to all standard wheelchairs, characterized by the following wide variety of adjustment and detachably attachment features:

(1) The table-desk is adjustable by the patient by a simple hand manipulative movement (i.e. without the use of tools) of the table top to the following variety of horizontally movable positions: forward extended (distant), intermediate, back inwardly close, and close locked-in positions; to the left side and to the right side positions; and left hand and right hand askew positions;

(2) The table top is adjustable by the patient also by simple hand manipulative movement (i.e. without the use of tools) to extendable vertically movable positions within a wide latitude;

(3) The table top is tiltable on its support again by simple hand manipulation to a variety of inclined positions; and (4) The table top is detachably attachable from its wheelchair mounting by a simple vertical lifting and replacing of the table top for such a variety of purposes as patient access and movement to and from the chair, collapsing the table for storage use or for over-night hanging of the table top to the chair, and for movement of the table top over a bed with the chair astride the bed.

The wheelchair of the invention is thereby adapted with its table top multiple horizontal positioning, vertical adjustment, tilting and detachment features, all by rapid hand manipulative steps, to serve countless patient activities, permitting ready freedom mobility of the patient. It is adapted for both left handed and right handed use. It permits easy access for the patient to use the table to do art work, painting, drawing, writing, reading and typing and to serve as a carry all for countless other activities available to the handicapped, in addition to affording use of the table for the serving of meals.

To the accomplishment of the foregoing objects and such other objects as may hereinafter appear, my invention relates to the wheelchair table-desk as more particularly defined in the appended claims taken with the following specification and the accompanying drawings, in which:

FIGS. 5 through 8 are plan views schematically showing a number of positions to which the table top may be horizontally moved:

Figure 2:
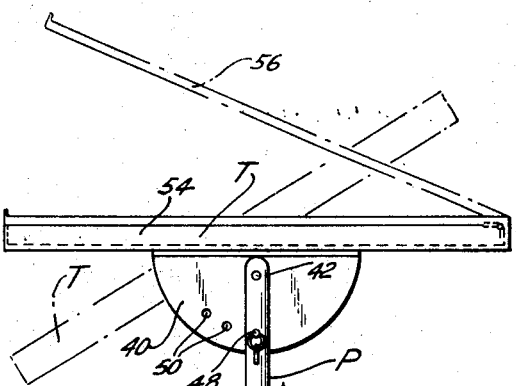
FIG. 2 is a side elevational view of the same viewed from the plane of the line 2—2 of FIG. 1, this figure also depicting the manner of tilting the table top.
Figure 3:
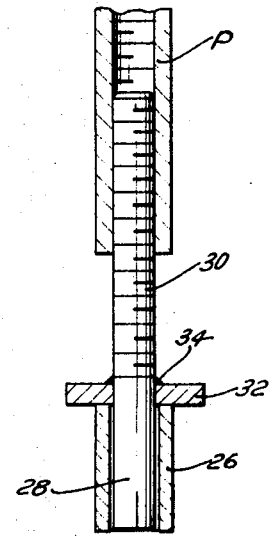
FIG. 3 is a fragmentary view shown to an enlarged scale of the means for vertically adjusting the table top, this view being taken in cross-section in the plane of the line 3—3 of FIG. 1.
Figure 4:
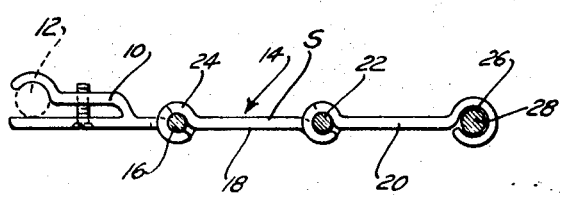
FIG. 4 is a plan view shown to an enlarged scale of one of the bracket supports for the table-desk, viewed from the plane of the line 4—4 of FIG. 2.
Figure 9:
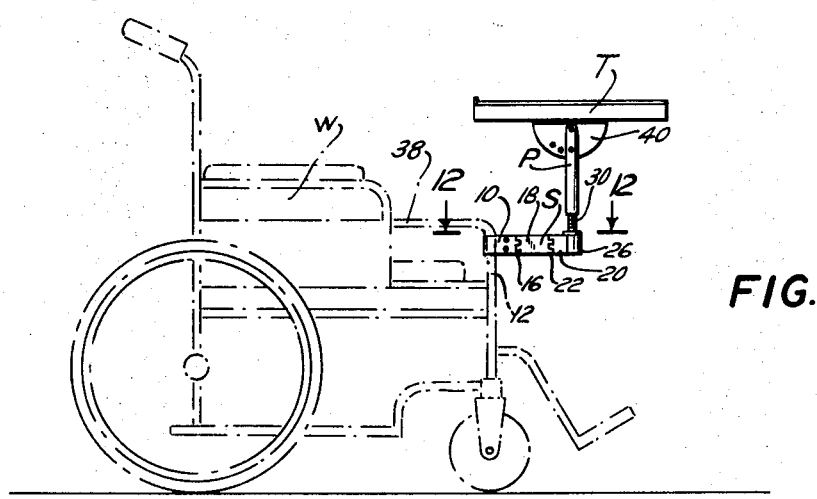
Figure 10:
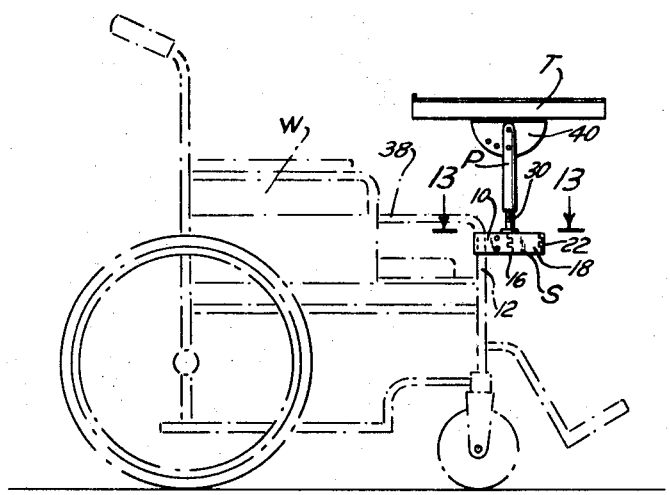
Figure 11:
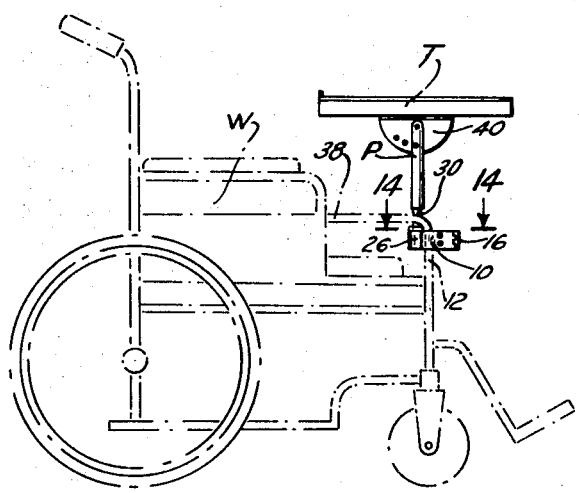
Figure 17:
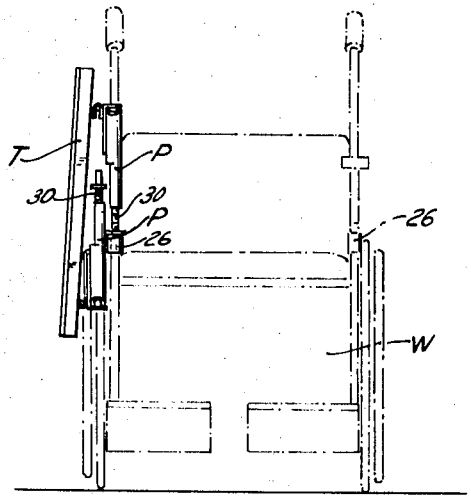
Figure 19:
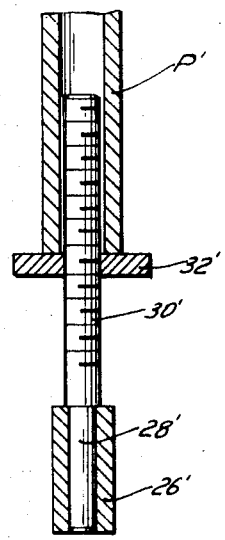
Figure 18:
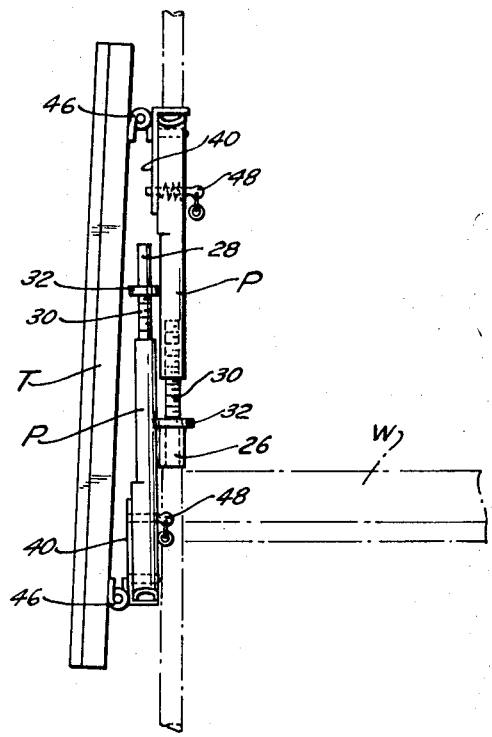

FIG. 5 depicting the table top in an extended forward position;
    FIG. 6 depicting the table top moved to a right side position;
    FIG. 7 depicting the table top moved to a right hand askew or oblique position; and
    FIG. 8 depicting the table top supported at one side of the wheelchair and moved to a position for being supported over a bed or the like;

FIG. 9 is a side elevational view of the table-desk corresponding to the view of FIG. 2 showing the same attached to a wheelchair, the table top being depicted in its horizontally extended forward position corresponding to the view of FIGS. 2 and 5;

FIG. 10 is a side elevational view thereof showing the table-desk moved horizontally inwardly to an intermediate position;

FIG. 11 is a side elevational view thereof showing the table-desk moved horizontally to an inwardly close position;

FIGS. 12 through 16 are plan views of the supporting means for the table-desk showing the different positions to which the supporting means are movable for moving the table top to a number of the variety of horizontally movable positions;

FIG. 12 depicting the same when the table top is moved to its extended forward position corresponding to that shown in FIG. 9, this view being taken from the plane of the line 12—12 of FIG. 9;

FIG. 13 depicting the same when the table top is moved to an intermediate position corresponding to that shown in FIG. 10, this view being taken from the plane of the line 13—13 of FIG. 10;

FIG. 14 depicting the same when the table top is moved to its inwardly close position corresponding to that shown in FIG. 11, this view being taken from the plane of the line 14—14 of FIG. 11;

FIG. 15 depicting the same (on a reduced scale) when the table top is moved to an inwardly close locked-in position; and FIG. 16 depicting the same (also on a reduced scale) when the table top is moved to an oblique or askew position for left handed use, otherwise corresponding to the view depicted in FIG. 7;

FIG. 17 is a front elevational view showing the table-desk moved to a position hung to one side of the wheelchair;

FIG. 18 is a view of FIG. 17 shown to an enlarged scale and in somewhat greater detail; and FIG. 19 is a fragmentary view of a means for vertically adjusting the table top alternative to that shown in FIG. 3 of the drawings.

Referring now more in detail to the drawings and having reference first to FIGS. 1 to 4 thereof, the wheelchair table-desk of the invention comprises a table-desk top T mounted on two spaced posts P, P, and supporting means therefor comprising two spaced supports S, S for detachably mounting the table top by detachably receiving the posts P, P.

The table top T is adapted to be adjusted by the patient by a simple hand manipulative movement, i.e. without the use of any tools, to the following variety of horizontally movable positions; forward distant (extended), intermediate, back inwardly close, close locked-in positions, to the left side and to the right side positions, and to left hand and right hand askew (oblique) positions. To accomplish this, each support S comprises a clamp 10 attachable to a part 12 of the wheelchair and a bracket generally designated as 14 connected to said clamp 10 for movement about a vertical axis 16, the said bracket having two arms 18 and 20 hinged together about a vertical axis 22 at their contiguous ends, the inner arm 18 being hinged at its end 24 to the clamp 10 for movement about the vertical axis 16 and the outer arm 20 being provided at its outer end with a receptor means in the form of a socket 26 for receiving a member part 28 of a post P.

The table top T is adjustable by the patient, also by simple hand manipulative movements, i.e. without the use of any tools, to extendable vertically movable positions within a wide latitude. This is accomplished by the provision of means structured to permit the vertical adjustment of the posts P, P relative to the supports S, S designed particularly to also permit the ready detachable attachment of the posts relative to the supports. In the structural form shown in FIGS. 1 to 4 of the drawings, such means comprises for each post P a threaded member 30 received by the internally threaded post P as shown in detail in FIG. 3 of the drawings, the said threaded member having the part 28 thereof telescopically receivable by the socket 26 of the bracket arm 20. A hand operated disk 32 resting on the socket 26 is welded as at 34 (FIG. 3) to the threaded member 30. With this structure it will be seen that by rotation of the hand operated disks 32, 32 the posts P, P may be vertically moved to different positions of height for vertical adjustment of the table top T. By means of this construction it will be further seen that the table top T with its posts P, P may be readily removed from the supports S, S by merely lifting the table top, thereby withdrawing the posts (with their threaded members 30, 30) from the bracket sockets 26, 26.

The different positions to which the table top may be horizontally moved (at any of its vertically adjusted positions) may now be described by reference to FIGS. 5 to 16 of the drawings. FIGS. 5 to 8 are schematic views showing in plan a number of these table positions. In FIG. 5 the table T, mounted on the wheelchair W is shown moved forwardly to its outwardly extended position. From this position the table may be moved to a variety of other positions such as intermediate and inwardly close positions (as will be described presently) by a movement generally in the direction of the arrow 36. FIG. 6 depicts the table T moved to a right side position, this being representative also of the ability to move the table to a similar but left side position. FIG. 7 depicts the positioning of the table T to an askew or oblique position serviceable for convenient use of a right handed person, this being also representative of the ability to move the table top to its reverse oblique or askew position serviceable for a left handed person. FIG. 8 depicts the movement of the table T relative to the wheelchair W in the direction indicated by arrow 37 to a position on one side of the wheelchair intended for being supported by a bed astride the wheelchair, this being accomplished by lifting the table top from the wheelchair and inserting the right side of the table top into the supporting bracket at the left side of the wheelchair.

In FIGS. 9 to 14 of the drawings I show the positions that the parts of the table-desk assume when the arms of the supporting brackets 14, 14 are manually manipulated to move the table top to the above indicated variety of positions. As shown in these figures, the clamps 10 of the supports are clamped to the legs 12 of the wheelchair standard hand grips 38.

In FIGS. 9 and 12 the two arms (18, 20) of each bracket 14, by simple manipulation by the patient are hingedly moved to the positions indicated in these figures, thereby positioning the table top T to its forward extended position. In FIGS. 10 and 13 of the drawings the said arms of each bracket 14 are hingedly moved by a similar manipulative movement to the positions indicated in these figures, thereby positioning the table to an intermediate position. In FIGS. 11 and 14 of the drawings, the arms of each bracket 14 are hingedly moved by simple manipulation to the positions indicated in these figures, thereby positioning the table to its rear or back inward close position. FIG. 15 is a view similar to FIG. 14 showing, however, the movement of the arms of the brackets 14, 14 to a position where the table top is moved inwardly to a close "locked-in" position, in which position the arms 20, 20 of the bracket are interengaged with the clamps 10, 10 to result in this locked-in position wherein the table top is stabilized against inward or outward movement. In FIG. 16 I show the positions assumed by the arms of the brackets 14, 14 when manipulated to these positions, the arms of the right hand bracket 14 being extended while the arms of the left hand bracket 14 are moved inwardly, the result being the positioning of the table T in an oblique or askew position serviceable for use by a left handed person. This position corresponds to, but is the reverse of, the oblique or askew position depicted in FIG. 7 of the drawings, which latter is adjusted for a right handed person. It will be understood that each of these positions to which the table is hingedly moved is effected by the patient when in sitting position merely manipulating the movement of the arms of both the right hand and left hand supporting brackets.

By means of the construction described it will be apparent that the table top T including its posts P, P is detachably attachable to the wheelchair mounting by a simple vertical lifting and replacing of the table top T from and to the bracket supports S, S, thereby permitting the patient access and movement to and from the wheelchair, removing the table for storage use, removing the same for overnight hanging of the table top to the chair, etc.

Figure 1:
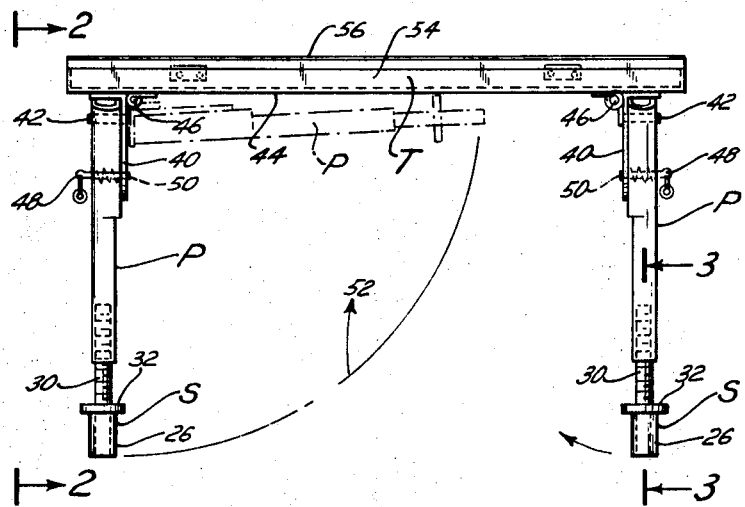
FIG. 1 is a front elevational view of the wheelchair table-desk of the invention in set-up condition and also depicting the manner in which the same may be folded for storage use.

Reverting to FIGS. 1 and 2 of the drawings, the table-desk is constructed to (a) permit the table top T to be tilted to a number of positions on the mounting posts P, P, and (b) to permit the table and the posts to be moved to a compacted collapsed condition when the same is detached from the supporting brackets S, S. To accomplish this there is attached to each side of the table top a flanged disk 40 to which the upper end of each post P is hinged by means of a pivot pin 42. The flanged disks 40, 40 are hinged to the underneath wall 44 of the table top T by means of the hinges 46, 46. The table top T is tiltable on its mounting posts P, P by movement thereof on the pivot pins 42, 42 and are secured in its adjusted tilted position by means of a spring loaded release pin 48 receivable by any of the spaced apertures 50 formed in the flanged disks 40, 40. It will be evident that by means of this construction, the table top T may be moved between the horizontal position indicated in full lines in FIG. 2 to inclined positions as indicated by the dot-dash lines indicated in FIG. 2, the table being secured or locked in these positions by manipulation of the release pins 48, 48. It will be also evident from this construction that the supporting posts P may be moved in the direction indicated by the arrow 52 in FIG. 1 from the supporting full line position to the collapsed dot-dash line position shown in FIG. 1 of the drawings.

FIGS. 17 and 18 of the drawings illustrate the mounting of the parts of the table-desk in a hung position on one side of the wheelchair. This is accomplished by first uplifting of the table T (with its posts P, P) from the bracket sockets 26, 26, collapsing the table parts in the manner described in connection with FIG. 1 to the condition shown in FIGS. 17 and 18 and then hanging the table-desk to one side of the wheelchair W by inserting one of the posts P via its threaded member 30 into one of the bracket sockets 26.

By means of the construction described in connection with FIGS. 1, 17 and 18, it will be evident that the table top is readily detachably attachable from and to its wheelchair mounting by a simple vertical lifting and replacing of the table top for such a variety of purposes as patient access and movement to and from the chair, collapsing the table for storage use or for overnight hanging of the table top to the chair, and also for movement of the table top to a position over a bed (as previusly indicated) with the chair astride the bed.

In FIG. 19 I show an alternative means for vertically adjusting the table top relative to the bracket support. In this alternative form there is provided a screw threaded member 30', the lower part 28' of which is attached to a bracket socket 26', the upper part of which threaded member is telescopically received by the post P' of the table, there being provided a hand rotatable threaded member 32' threadedly engaging the thread of the member 30'. In this form of construction rotation of the member 32' will effect the vertical adjustment, via the posts P' of the table. For speed of operation this adjustment may be attained by removing the table top with its posts from the threaded member 30' and by rapidly rotating the member 32' to any desired position. It will be observed that in both forms of structure depicted in detail in FIGS. 3 and 19 of the drawings, the table top may be quickly removed merely by uplifting the same from the bracket supports.

The structure, operation, use and advantages of the wheelchair table-desk of my invention, and particularly the many positions to which the table-desk may be moved both in horizontal directions and in a vertical direction for the widely diversified uses thereof by a patient will be fully apparent from the above detailed description. The described table-desk is ideal for use in conjunction with occupational therapy in hospitals and nursing homes, the same being a particular aid to quadraplegics in occupational therapy. The table top T itself may be constructed for a variety of uses and may be made to comprise a receptacle section 54 having a hinged top 56. The table-desk is adapted for all standard wheelchair widths and it can be adjusted to fit all makes and sizes of wheelchairs. The entire table-desk unit provided is also made of a minimum of parts which are light in weight and may be easily handled by a paraplegic.

Also, for permitting detachment of the table-desk as a whole, the hinge 16 of the support S may be provided with a pull out hinge pin 60 (FIG. 2). For securing the parts of the table in any adjusted horizontal position, the hinge pin 60 of the hinge 22 may be a nut-bolt 62 (FIG. 2).

While I have shown the table-desk of my invention as specially attachable for and attachable to a wheelchair, it will be understood that the table-desk structure of the invention is equally attachable for attachment and may be attached to other types of chairs or other supports for securing all the described uses and benefits of the occupant. It will therefore be understood that wherever reference is made herein to a "wheelchair" it is intended to include such other supports.

It will be apparent that many changes may be made in the structure and arrangement of the parts of the table-desk of the invention without departing from the spirit of the invention defined in the following claims.

What is claimed is:

1. A wheelchair table-desk comprising a table-desk top, two spaced posts, one on each side of said table-desk top, connected to and mounting said top, and a support for the table-desk comprising a clamp for each side of the wheelchair attachable to a part of the wheelchair and a bracket connected to each clamp, said bracket having two arms hinged together about a vertical axis at their contiguous ends, the inner one of the arms being hinged at its other end about a vertical axis to the clamp and the outer one of said arms being provided at its other end with a receptor means for rotatably receiving a post of the table-desk, the table top being thereby adjustable by a hand manipulative movement to the following variety of horizontally movable positions: forwardly extended, intermediate horizontal, retracted inwardly close, close locked-in positions, to the left side and to the right side positions, and to the left hand and right hand askew positions.

2. The wheelchair table-desk of claim 1 in which said table-desk is detachably attachable to said bracket by the telescopic detachable reception of the table posts relative to said bracket receptor means.

3. The wheelchair table-desk of claim 1 in which the table top is tiltably mounted for adjustable movement about a horizontal axis on said posts, and means is provided in said table top and posts for securing the table top to said posts in relatively adjusted tilted positions.

4. The wheelchair table-desk of claim 1 in which the said receptor means in each outer arm of said brackets comprises a socket for one of the posts of said table-desk.

5. The wheelchair table-desk of claim 1, in which each table-desk post and each of the said bracket receptor means is provided with a device for effecting the vertical adjustment of the table top relative to the said table-desk support.

6. The wheelchair table-desk of claim 5, in which said device comprises a screw adjustable member interconnecting a post with said bracket receptor means.

7. The wheelchair table-desk of claim 5 in which said device comprises an adjustable screw member threadedly receivable at one end by a table top post and telescopically receivable at its other end by a bracket receptor means.

8. The wheelchair table-desk of claim 7 in which the table top is removably attachable to the table-desk support by a vertical lifting and replacing of post received device relative to the bracket receptor means.

9. The wheelchair table-desk of claim 5 in which said device comprises an adjustable screw member telescopically receivable at one end by a table top post and attached at its other end to the bracket receptor means.

10. The wheelchair table-desk of claim 9 in which the table top is removably attachable to the table-desk support by the vertical lifting and replacing of the table posts relative to screw attached bracket receptor means.

References Cited

UNITED STATES PATENTS

| | | | |
|---|---|---|---|
| 233,552 | 10/1880 | Richardson | 248—188.4 |
| 790,217 | 5/1905 | Mason | 248—282 |
| 175,176 | 3/1876 | Sheldon | 297—170 |
| 1,060,795 | 5/1913 | Smith | 248—283X |
| 1,240,192 | 9/1917 | French | 297—343 |
| 2,365,570 | 12/1944 | Lee | 297—342X |
| 2,937,694 | 5/1960 | Willson et al. | 297—153 |
| 3,031,086 | 4/1962 | Blair | 248—282X |
| 2,610,903 | 9/1952 | Stone | 108—144 |

BOBBY R. GAY, Primary Examiner

P. A. ASCHENBRENNER, Assistant Examiner

U.S. Cl. X.R.

108—6, 129, 137, 147; 248—188.4, 283; 297—153